United States Patent
Nakao et al.

(12) 
(10) Patent No.: US 6,183,876 B1
(45) Date of Patent: Feb. 6, 2001

(54) PREFORM AND PRODUCTION METHOD THEREFOR

(75) Inventors: Yasuhiro Nakao; Kunitoshi Sugaya; Hiroto Shoji, all of Saitama (JP)

(73) Assignee: Honda Giken Kogyo Kabushiki Kaisha, Tokyo (JP)

( * ) Notice: Under 35 U.S.C. 154(b), the term of this patent shall be extended for 0 days.

(21) Appl. No.: 09/111,026

(22) Filed: Jul. 7, 1998

(30) Foreign Application Priority Data

Jul. 10, 1997 (JP) .................................................. 9-184723

(51) Int. Cl.[7] .................................. B22D 19/14; C22C 1/09
(52) U.S. Cl. ...................... 428/539.5; 164/97; 428/542.8; 428/614
(58) Field of Search ........................... 164/97; 428/539.5, 428/614, 542.8

(56) References Cited

U.S. PATENT DOCUMENTS 5,620,804 * 4/1997 Kennedy et al. ..................... 428/609
5,753,374 * 5/1998 Camilletti et al. ................... 428/446

FOREIGN PATENT DOCUMENTS

| 5-255776 | 10/1993 | (JP) . |
| 6-192765 | 7/1994 | (JP) . |
| 8-53724 | 2/1996 | (JP) . |

* cited by examiner

*Primary Examiner*—D. S. Nakarani
(74) *Attorney, Agent, or Firm*—Merchant & Gould P.C.

(57) ABSTRACT

For forming a preform of composite material, such as aluminum-based composite material (MMC) by using friction during the forming thereof, ceramic reinforcement, such as $Al_2O_3$ and binder are prepared, and the prepared reinforcement and the silanor group binder are put into a die for press forming. During the forming, polycondensation occurs due to frictional heat generated between the fibrous or grain-like particles of the reinforcement and the silanor group binder to harden it, thereby obtaining a preform in which the particles of the reinforcement are fixedly connected to one another.

3 Claims, 4 Drawing Sheets

PREFORM AND PRODUCTION METHOD THEREFOR

BACKGROUND OF THE INVENTION

1. Field of the Invention

The present invention relates to a preform as a basis of a composite material, such as aluminum-based composite material (MMC), and a production method therefor.

2. Description of Related Art

For the purpose of dispersing a reinforcement agent (herein after referred to as a reinforcement) throughout a composite material uniformly and so on, in a conventional art, a preform of a predetermined shape is produced, and it is impregnated with melted metal of a matrix-type metal by way of a forging method and an infiltration method, so as to produce a billet.

As a production method for the above-mentioned preform, a wet method is commonly used as shown in FIG. 4. Namely, water, reinforcement (ceramic fiber) and binder are prepared, and after being mixed together and adjusted, the mixture is processed by press-forming. Next, after being removed from the press, the press-formed product is dried so as to form the preform.

The wet method mentioned above, however, has problems in that the number of processes is large, and therefore the time for production is long. Further, the preform is easily broken (has high fragility), for instance, when it is removed from the die, or during the drying and baking processes. Furthermore, since water is required for the wet method, if a process for impregnating the preform with a melted metal is located close to the process for producing the preform, there must be provided means for avoiding contact between the melting metal and the water, and therefore, the wet method comprises obstacles for industrially performing the production processes from the preform to the billet on an in-line process.

Moreover, with the wet method, metal powder, which is added for obtaining a composite material of high strength and high functionality, is oxidized. As a result, it is sometimes impossible to obtain satisfactory results.

Further, according to Japanese Laid-open Patent No. Hei 5-255776 (1993) and Japanese Laid-open Patent No. Hei 6-192765 (1994), etc., there has been proposed a dry method.

In this dry method, ceramic reinforcement and inorganic binder mainly containing $SiO_2$ are mixed together, and after being formed by applying pressure, the mixture is heated.

Further, a dry method using an organic binder has been disclosed in Japanese Laid-open Patent No. Hei 8-53724 (1996).

In this dry method, in particular in a case where the organic binder is used, the mixture must be heated to a high temperature (600° C. to 1,100° C.) after being formed by the application of pressure thereto. Further, in the conventional dry method using organic binders, it is necessary to add a large amount of binder into the reinforcement. These are all problems

SUMMARY OF THE INVENTION

An object, in accordance with the present invention, for resolving the drawbacks in the conventional art mentioned above, is to provide a preform and a production method therefor, in which a preform can be obtained by the dry method without using water, which preform has sufficient strength and uses less binder.

Namely, in a preform, in accordance with the present invention, fibrous or grain-like particles in a ceramic reinforcement are bonded to one another into a polycondensation body produced by the polycondensation of a binder of the silanor group, thereby achieving strength higher than 200 kg/cm², being sufficient for the handling thereof.

The ceramic reinforcement mentioned above can be any one containing fibrous, whisker-like, or grain-like shaped particles therein, and as an example, aggregate alumina can be cited. The aggregate alumina comprises alumina particles of 1–2 $\mu$m aggregating to secondary particles of sizes from several tens of $\mu$m to several hundreds of $\mu$m, and has a very large specific surface. In accordance with the present invention, it is possible to adhere the particles having a large specific surface together (porous body).

Further, the preform can be improved in the characteristic values thereof, by adding thereto metal powder of Fe or Mg or the like.

Moreover, in accordance with the present invention, there is provided a method for producing a preform, comprising the steps of:

mixing a binder of a silanor group with fibrous or grain-like particle-containing ceramic reinforcement in a ratio which is greater than 0.5 wt % and less than 2.0 wt %;

forming the mixture obtained in the above step and polycondensating the binder of silanor group through friction between the particles of the ceramic reinforcement and the binder of silanor group during the forming; and bonding the particles of the ceramic reinforcement to one another in a polycondensation body produced by said polycondensation step.

As the silanor group binder, a mixture of silanor and siloxane, or polymethylsilasesquioxane is appropriate. A chemical formula is shown below:

[Chem. 1]

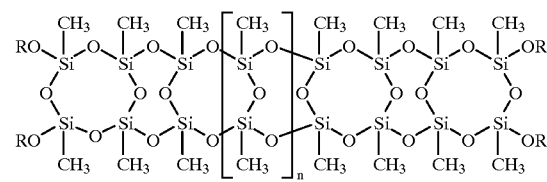

wherein R: —$CH_3$ or —H

In the case where the mixture of silanor and siloxane is used as the binder, as is shown in FIG. 1, polymethyl siloxane having a molecular weight from 1,000 to 3,000 is produced by the polycondensation between the silanor and the siloxane in a region of low temperature, and thereby the polymethyl siloxane bonds the particles of the reinforcement ($Al_2O_3$) to one another. Here, the region of low temperature indicates the region of temperature at the time when the preform is formed, and is a temperature approximately in the range of 40° C. to 100° C.

However, if the formed preform is impregnated with melting metal, the polymethyl siloxane is heated to be changed into $SiO_2$.

FIG. 2 is a graph showing the relationship between the amount of binder added and the strength of the preform when the polymethylsilasesquioxane is used as the silanor group binder. As is apparent from this graph, taking into consideration the handling characteristics, such as setting the preform into a die after the forming thereof, it is necessary that the preform has a strength higher than 200 kg/cm², and it is apparent that the polymethylsilasesquioxane should be greater than 0.5 wt % with respect to the reinforcement for obtaining such a strength.

On the other hand, since the strength of the preform is not additionally improved even if the amount of polymethylsilasesquioxane added is increased above 2.0 wt %, it is therefore preferable that the addition amount of the polymethylsilasesquioxane be greater than 0.5 wt % but less than 2.0 wt %.

There is also shown the strength when the polymethylsilasesquioxane is changed into $SiO_2$ in FIG. 2. However, it is not necessary for the preform in accordance with the present invention to be heated so that the polymethylsilasesquioxane is changed into $SiO_2$.

Further, though having made experiments on binders of the silanor group other than polymethylsilasesquioxane, the same result is obtained in the relationship between the addition amount of the binder and the strength of the preform obtained. Therefore, it is preferable that the amount of binder of silanor group to be added is greater than 0.5 wt % but less than 2.0 wt %.

Here, as the forming method of the preform, for example, press-forming or blow-forming is appropriate.

DESCRIPTION OF THE PREFERRED EMBODIMENTS

Hereinafter, detailed explanation of the embodiments according to the present invention will be given by referring to attached drawings.

Figure 1:
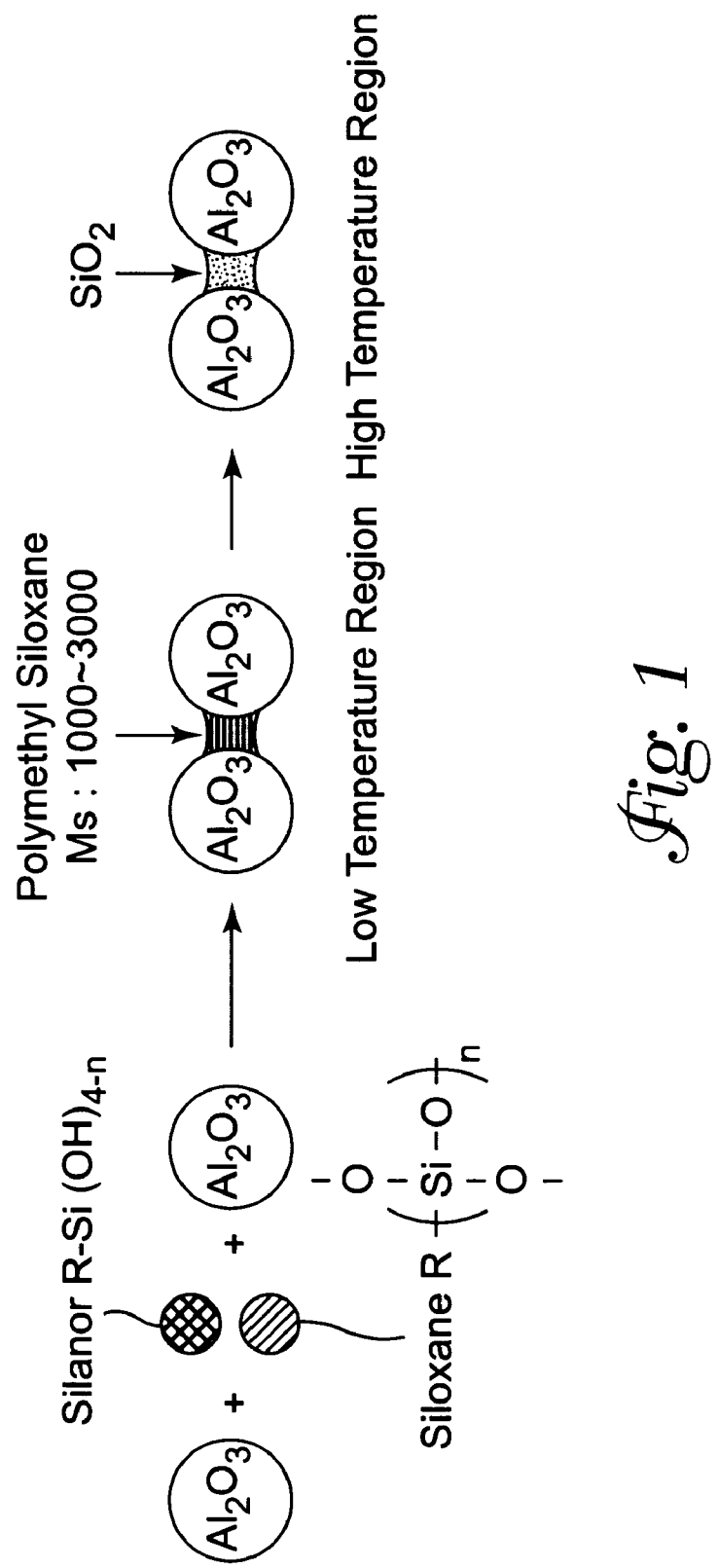
FIG. 1 is a schematic diagram showing bonding reinforcement, in the case where silanor and siloxane are used as the binder.
Figure 2:
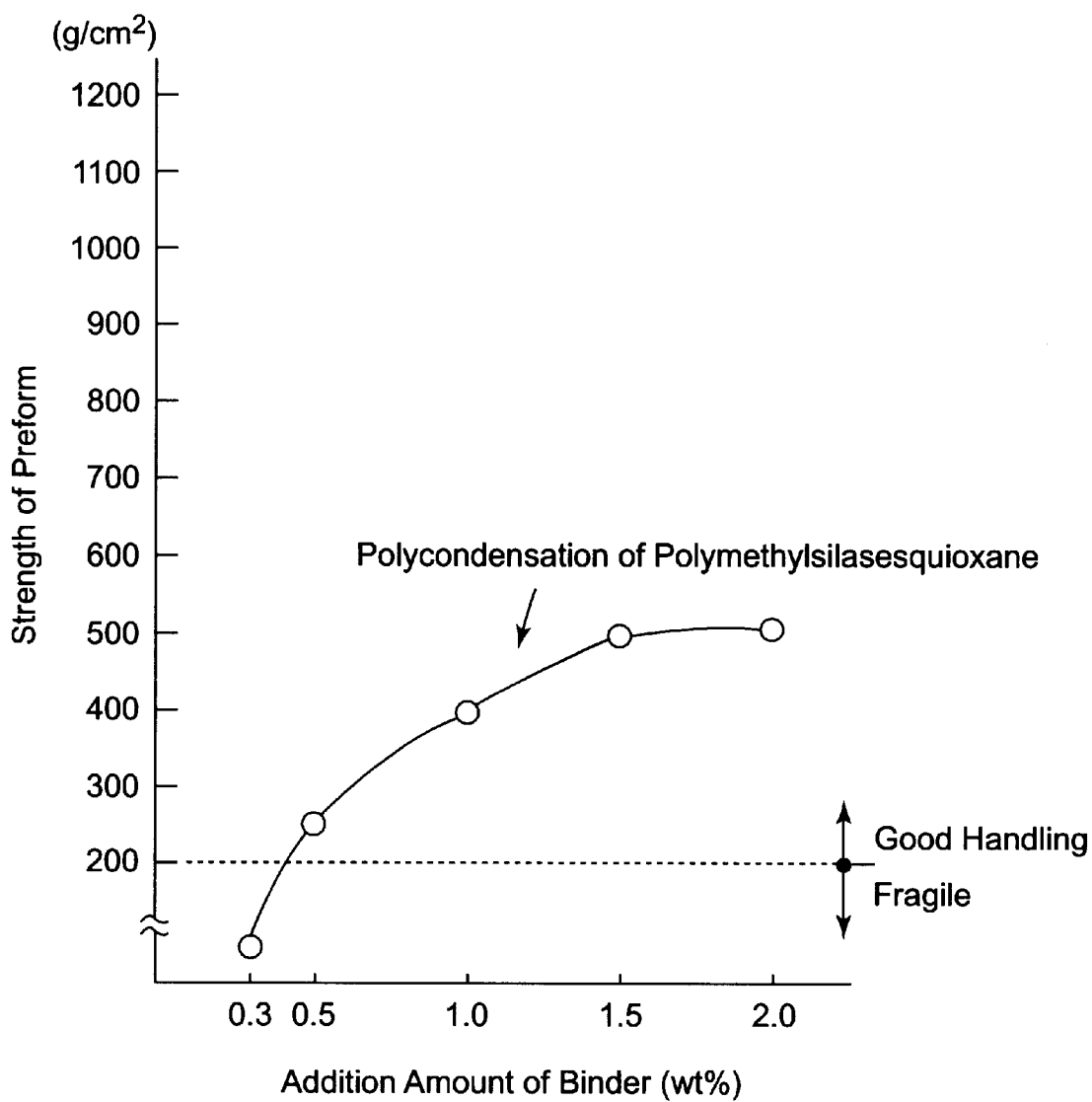
FIG. 2 is a graph showing a relationship between the addition amount of the binder and the strength of the preform, in the case where polymethylsilasesquioxane is used as the binder of silanor group.
Figure 3:
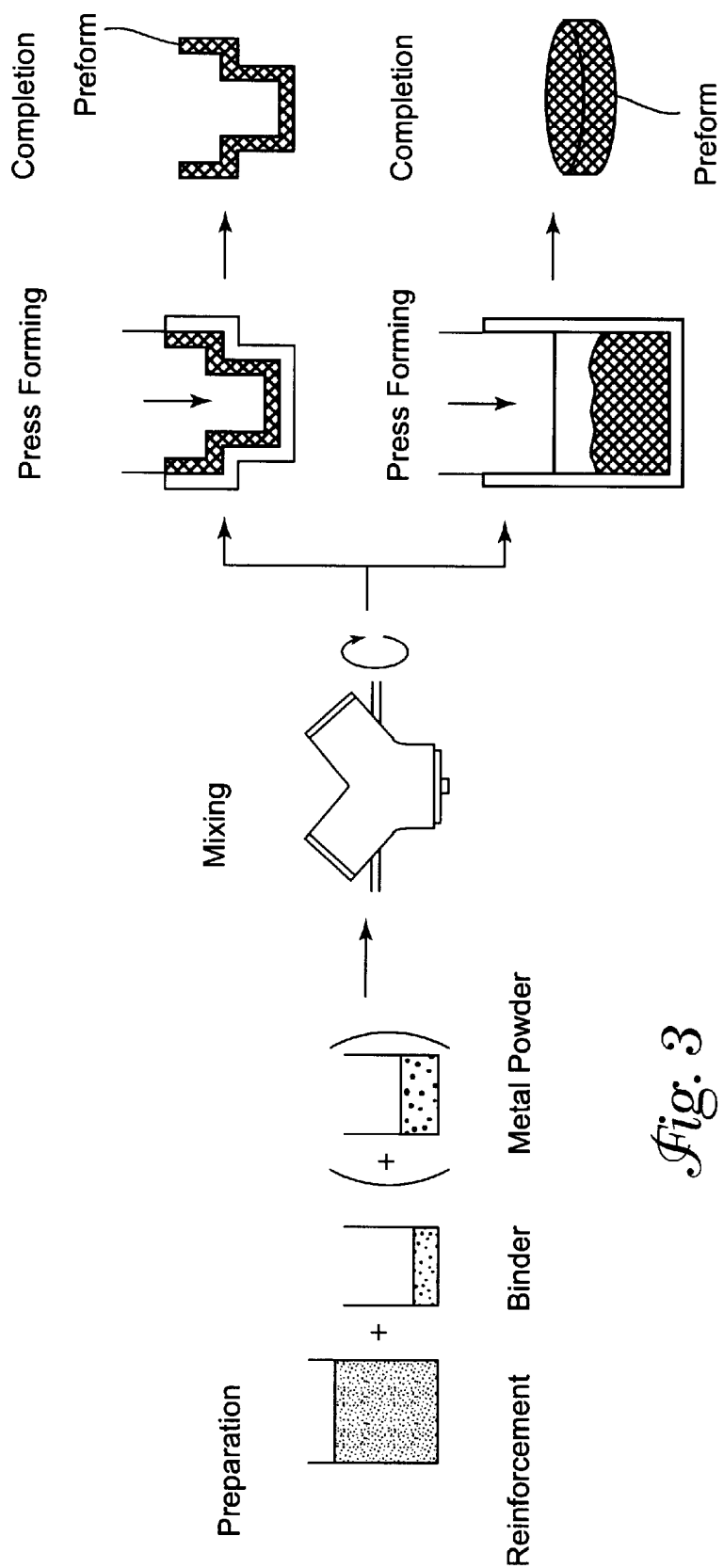
FIG. 3 is a process diagram showing a production method of the preform, in accordance with the present invention.
Figure 4:
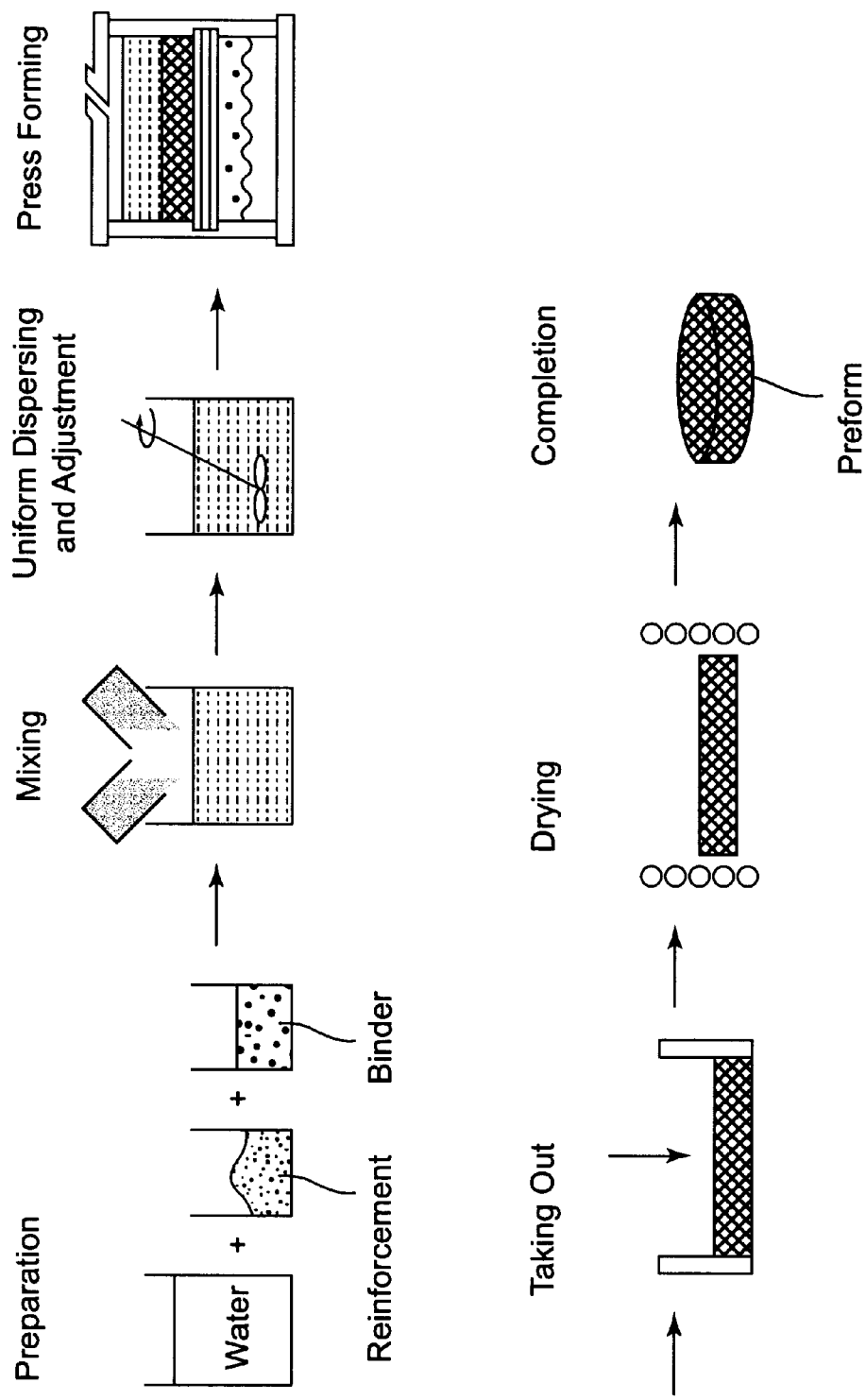
FIG. 4 is a diagram showing a production method for the preform, in accordance with the prior art.

FIG. 3 is a process diagram showing the production method for the preform in accordance with the present invention, and first of all, in the present invention, ceramic reinforcement of $Al_2O_3$ or the like and binder are prepared. At this time, for obtaining high strength and high functionality, it is possible to add metal powder, such as Fe, Mg or the like.

Next, the prepared reinforcement and the binder (comprised, in this example, from a silanor group) are mixed and the mix is cast into a die for press-forming. In place of this press forming, blow forming also can be applied.

During the die forming, due to frictional heat generated between the particles of the reinforcement and the silanor group binder, the polycondensation causes the mix to harden, thereby fixedly bonding the particles of the reinforcement to one another.

Hereinafter, concrete embodiments and a comparison will be given.

Embodiment 1

To 1,000 g of aggregate alumina (average particle diameter: 40 μm) is added 20 g of polymethylsilasesquioxane, and they are mixed by a V-type mixer for 30 min. so as to obtain a powder mixture that is uniformly dispersed. This powder mixture is poured into a press-forming die, and is pressed with a pressure of 200 kgf/cm² to form a preform having, for example, a cylindrical shape, having a diameter of 150 mm and good handling characteristics.

This preform is set in a mold to be impregnated with melted metal of aluminum alloy (5056) by a squeeze cast, thereby obtaining an $Al_2O_3$/Al composite material. Further, the volume containing ratio (Vf) of the preform in the composite material being obtained is about 25%.

Embodiment 2

To 1,000 g of aggregate alumina (average particle diameter: 40 μm) is added 20 g of polymethylsilasesquioxane, and further 100 g of Fe powder is added thereto. After this, the mix is treated in the same manner as in embodiment 1 to form the preform, thereby obtaining an $Al_2O_3$/Al composite material. Further, a volume containing ratio (Vf) of the preform in the composite material being obtained is about 25%.

Embodiment 3

To 1,000 g of aggregate alumina (average particle diameter: 40 μm) is added 20 g of polymethylsilasesquioxane, and further 100 g of Fe powder and 20 g of Mg powder are added thereto. After this, the mix is treated in the same manner as in embodiment 1 to form the preform, thereby obtaining an $Al_2O_3$/Al composite material. Further, a volume containing ratio (Vf) of the reform in the composite material being obtained is about 25%.

Embodiment 4

Forming a preform under the conditions same to those of embodiment 3, the preform and an aluminum alloy (5056) are set in a vacuum furnace. After being purged of nitrogen gas, it is heated to 850° C. under a reduced pressure atmosphere of 200 hPa (hectopascal) to melt the aluminum alloy to be impregnated into the preform, thereby obtaining a composite material. A volume containing ratio (Vf) of the preform in the composite material being obtained is about 25%.

Embodiment 5

To 1,000 g of aggregate alumina (average particle diameter: 40 μm) is added 20 g of polymethylsilasesquioxane, and 20 g of Mg powder is added thereto. After this, the mix is treated in the same manner as in the embodiment 4 to form the preform, thereby obtaining an $Al_2O_3$/Al composite material. Further, a voluminous containing ratio (Vf) of the reform in the composite material being obtained is about 25%.

Comparison

After adding 1,000 g of aggregate alumina (average particle diameter: 40 μm), 100 g of Fe powder and 20 g of Mg powder into water a solution containing silica sol and stirring them sufficiently, the mix is filtered and pressure-shaped by suction so as to obtain a preform of a cylindrical shape having a diameter of 150 mm. It is further adjusted by a press-forming step so as to obtain a 25% volume containing ratio (Vf) therein, and this is put into an electric furnace to be heated to 400° C., for the purpose of removing water therefrom and fixing thereof. After cooling, a preform having good handling characteristics can be obtained. With this preform, a composite material is obtained through an activating compound method (a decompression permeation method) which is the same as in embodiment 4.

Measured results of embodiments 1 through 5 and the comparison, i.e., the forming time of the preform, the strength of the composite material and so on, are shown in the Table below. From this table, in accordance with the present invention, the time for forming the preform can be reduced to ¼ that of the conventional comparison, through which it is still possible to obtain sufficient strength. (See Table below.)

TABLE

| | Reinforcement | Vf | Metal Powder | Preform Method | Preform Forming Time | Composite Method | Strength |
|---|---|---|---|---|---|---|---|
| Embodiment 1 | Alumina | 25 | — | Dry Method | 40 min | Squeeze Cast | 294 MPa |
| Embodiment 2 | Alumina | 25 | Fe | Dry Method | 40 min | Squeeze Cast | 372 MPa |
| Embodiment 3 | Alumina | 25 | Fe, Mg | Dry Method | 40 min | Squeeze Cast | 352 MPa |
| Embodiment 4 | Alumina | 25 | Fe, Mg | Dry Method | 40 min | Decompression Permeation | 352 MPa |
| Embodiment 5 | Alumina | 25 | Mg | Dry Method | 40 min | Decompression Permeation | 300 MPa |
| Comparison | Alumina | 25 | Fe, Mg | Wet Method | 160 min | Decompression Permeation | No melting metal permeates into the preform |

As is fully explained above, with the preform and the production method therefor, according to the present invention, since the particles of the reinforcement are bonded by polycondensating the silanor group binder, it is possible to obtain a strength higher than 200 kg/cm$^2$ which is necessary for industrial handling of the preform.

In particular, in accordance with the present invention, since the polycondensating of the silanor group binder is carried out using microscopic friction between the ceramic reinforcement particles and the binder when the preform is formed, no specific heating process nor heating apparatus is required.

Further, in general, alumina powder has poor flowablity Therefore, it cannot easily pass through a hole of a machine for measuring flowablity, having a diameter of 5 mm, for example. However, with the addition of the silanor group binder to the reinforcement, it can easily pass through a hole of 5 mm diameter. This means that the melting metal of aluminum can easily permeate into the preform of the present invention.

What is claimed is:

1. A preform for forming a composite comprising particles of aggregate alumina ceramic reinforcement bonded to one another through a polycondensation body produced by the polycondensation of a silanor group binder wherein the preform has a strength higher than 200 kg/cm$^2$.

2. The preform of claim 1 further comprising metal powder of Fe or Mg.

3. The preform of claim 1 wherein the silanor group binder is 0.5 wt. % to 2 wt. % with respect to the reinforcement.

* * * * *